July 31, 1962  V. R. JOHNSON ET AL  3,047,836
APPARATUS FOR PROCESSING SEISMIC DATA
Filed Nov. 23, 1956  2 Sheets-Sheet 1

Virgil R. Johnson
Jesse D. Skelton  Inventors

By James A. Reilly  Attorney

FIG.-3

United States Patent Office 3,047,836
Patented July 31, 1962

3,047,836
APPARATUS FOR PROCESSING SEISMIC DATA
Virgil R. Johnson and Jesse D. Skelton, Tulsa, Okla., assignors, by mesne assignments, to Jersey Production Research Company
Filed Nov. 23, 1956, Ser. No. 624,035
14 Claims. (Cl. 340—15.5)

This invention broadly relates to a method and apparatus for use in seismic prospecting. More particularly, it relates to a method and apparatus for obtaining information from reproducible seismograms—especially for the purpose of correlating, interpreting or otherwise processing data on the seismograms to obtain information of interest therefrom.

The apparatus is especially suited and intended for presenting data obtained from reproducible seismograms in a form suitable for further presentation to a digital computer. The invention is further especially adapted and intended for use in conjunction with a method of seismic prospecting which is conventionally referred to as velocity profiling.

Seismic methods are now widely employed in prospecting for subterranean mineral deposits including mineral oils. Briefly, seismic methods are characterized primarily by the principle of initiating a seismic disturbance at one point near the surface of the earth and determining the periods of time that it takes for resulting seismic waves to travel from the initiation point to a plurality of spaced detection points. Since at least a portion of the waves that reach the detection points are waves that are reflected from subsurface strata, it follows that it becomes possible to calculate the depths of the strata.

In most seismic prospecting operations, it is conventional practice to create a seismic disturbance by detonating an explosive charge which is located preferably at the bottom of a shot hole and just below the low velocity layer (LVL) that underlies the surface of the earth. Detectors in the form of geophones or equivalent seismic transducers are arranged in a spaced relationship in the vicinity of the shot point; and precision equipment is used to detect the occurrence and magnitude of the seismic signals that are received by the detectors. The precision equipment is provided with accurate time measuring means for determining the intervals of time that elapse between the seismic disturbance and signal arrivals at the detectors.

Generally speaking, the most common practice for arranging seismic detectors is to position them in a straight line leading away from a shot point. It is further substantially conventional practice to carry out several seismic observations, including shot points and detector locations, in a continuous straight line; and this technique is popularly referred to as profiling.

In any given seismic observation, it is general practice to record the signals from adjacent detection points in a side-by-side relationship on a suitable recording medium. The actual records thus formed may be oscillographic traces recorded on ordinary or photographic paper; or they may be "phonographically reproducible" traces such as variable density or variable area traces recorded on photographic media and magnetic traces recorded on magnetic media. In any event, the records obtained from a plurality of geophone locations in one observation are generally collectively referred to as a seismogram. Expressed otherwise, then, a seismogram is essentially a time record indicating the magnitudes and arrival times of seismic signals reflected from subterranean strata relative to a common reference time point.

Inasmuch as the information of primary interest on a seismogram is concerned with the reflected events that are recorded thereon, it is general practice in the art to use the records to determine the depths of the strata that are responsible for particular events on the seismogram. Inasmuch as the geophones in any given array may vary substantially in its time of occurrence on the distances from the shot point, it will be appreciated that corresponding information on the individual traces may vary substantially in its time of occurrence on the traces. In other words, a seismic wave reflected from a given stratum will usually reach the lower or the nearer of two seismic detectors first; and the traces reporting on the two detectors will show different arrival times for the same reflection event.

Since any one seismogram from a single observation is generally made up of the information received from some twenty or more detector locations, it will be recognized that a person interpreting such information is faced with a serious problem of selecting significant information and discarding insignificant information. The interpreter must also perform complicated mathematical analyses of the selected information, incorporating corrections for such factors as geophone elevation and spacing and "spread" before intelligent analysis of the information is completely possible. Needless to say, this procedure is extremely time-consuming, expensive and tedious. Furthermore, the accuracy of the information ultimately obtained is to a great extent controlled by the interpreter's knowledge of the velocity of seismic waves in the portion of the earth under study. The latter information is sometimes available from well logging operations; but it is frequently necessary to assume the best values possible.

In view of these and other shortcomings and disadvantages of present seismic prospecting techniques, increasing efforts are being made to simplify and accelerate the interpretation of seismic records. For example, equipment has recently been developed which is capable of semi-automatically "playing back" an uncorrected seismogram (e.g. a reproducible seismogram such as one formed on magnetic tape) to form a corrected seismogram or "seismic section" in which errors occasioned by the low velocity layer, different geophone elevations and spread distances are corrected for. Corrected sections have proven to be very helpful—especially to the petroleum industry—in the interpretation of seismic data. It is still necessary, however, even with these corrected sections to perform numerous calculations and velocity assumptions before the information on the sections can be completely digested and utilized.

Relatively recently, a form of seismic prospecting referred to as "velocity profiling" has been initiated and developed in order to improve upon the quality of the information obtained from seismic observations. This technique, in general, employs geophone arrays in which the individual geophone stations are spaced from one another substantially greater distances than are used in more conventional profiling operations. Furthermore, the elevations and spacings of the geophone locations are determined with greater accuracy. The information which results from the use of this technique is capable of rigid mathematical analysis and makes it possible to determine quite accurately the velocities of seismic waves throughout the portion of the earth under investigation. It will be recognized, of course, that while this technique provides greatly improved seismic information; the technique makes even greater demands upon the interpreter in the form of increased mathematical work. Indeed, the mathematical operations becomes so detailed, precise and lengthy, that the procedure is substantially impractical for manual types of operation.

In view of the above factors that presently militate against the use of precision seismic procedures such as velocity profiling, it is a primary object of this invention to provide an apparatus and method for accelerating and and facilitating the processing of information from seismograms. More particularly, it is an object of the invention to provide a system for digesting, correlating and organizing information from a seismogram in a substantially automatic manner. It is still further an object of the invention to improve upon the accuracy, speed and reliability of methods for interpreting seismic data. More specifically, it is an object of this invention to provide an apparatus and method for extracting information from seismograms and for transmitting the information in suitable form to high speed computing machines which are capable of automatically and quickly providing the ultimate information desired.

These and related objectives, which will be explicitly described or readily apparent from the following description, are attained in accordance with this invention by systematically scanning a reproducible seismogram, extracting and reproducing portions of interest in each trace. More particularly, the seismogram is examined beforehand and reflection crossings or other events noted thereon. The crossings or other events of interest on each trace are then sequentially reproduced; and the reproduced signals in turn are utilized through a time adjustment means to reproduce the corresponding crossings or events on other traces in the seismogram. The time adjustment means is generally required in view of the variations in reflection times that exist from trace to trace in a seismogram as explained earlier.

Concurrently with the selective reproduction of reflection crossings on a seismogram, the present invention systematically arranges or organizes the reproduced information in time correlation. In other words, the time interval between a standard reference time and the occurrence of a reflection or other event on each trace is measured, correlated and recorded on a recording medium. Thus, in a preferred embodiment of the invention, the occurrences in time of reflections along a seismic trace are measured and converted as by means of an analog to digital converter into a type of record adapted to be processed by a high speed computing machine. At this point, it is well to note that the term high speed computing machine as employed herein is intended to mean primarily an automatic digital computer, preferably of the punched card type. The invention not only supplies such a machine with reflection time information, but it also provides the machine with correlated information in that the reflections on all traces corresponding to each single reflection crossing are identified.

The invention may be better understood by reference to the attached drawing in which.

Figures 1, 2:
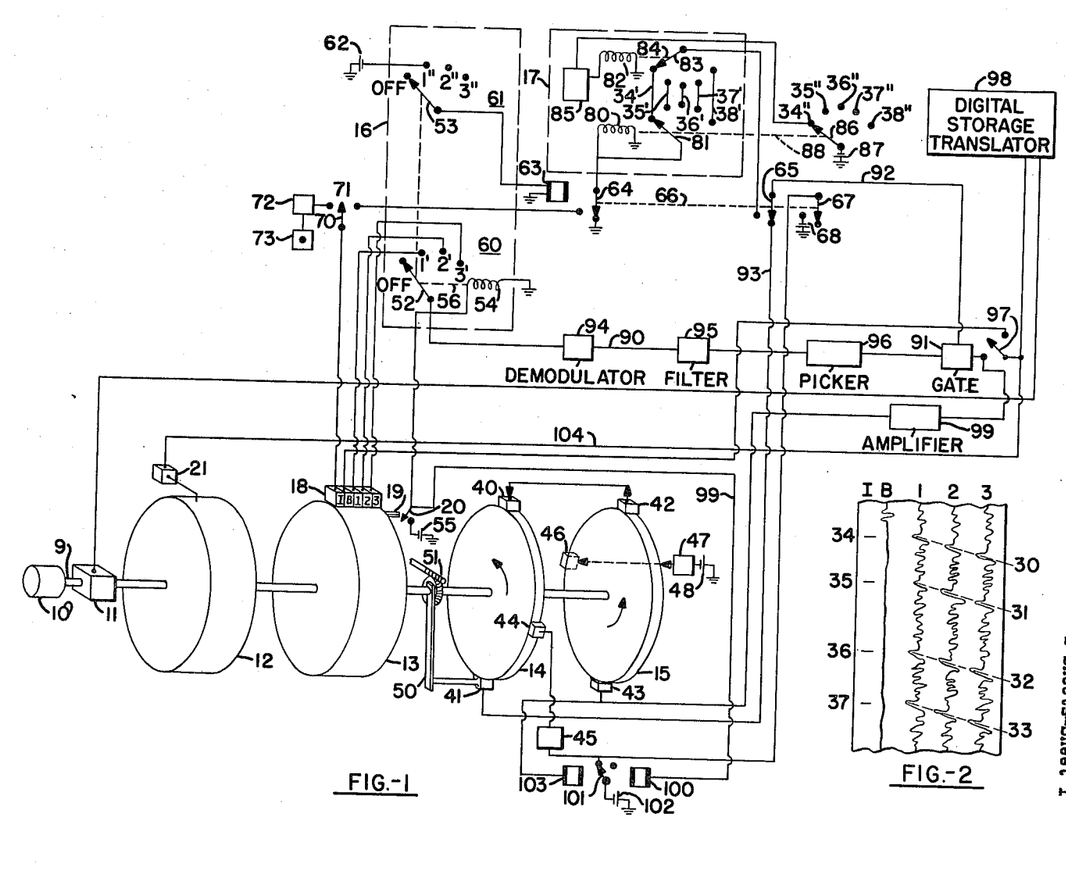
FIGURE 1 illustrates a preferred embodiment of the invention as well as the best mode contemplated for carrying out the invention.
FIGURE 2 illustrates schematically and in simplified form a type of visual seismogram such as may be mounted on the monitor drum of the apparatus of FIGURE 1.

Referring specifically to FIGURE 1, it will be seen that the apparatus illustrated therein includes a motor 10; an analog to digital converter 11; a monitor drum 12; a gate trace drum 14 and a transfer drum 15. All of these members are mounted on a common shaft 9 and are driven at a uniform and substantially constant speed by the motor 10. The apparatus in the figure also includes a trace selector 16 and a crossing selector 17, both of which are indicated by dotted line enclosures.

Drum 13 is of a character adapted to hold a reproducible-type, multi-trace seismogram. It is provided with a multiple-head bank of transducers 18 which are adapted to reproduce the traces on the seismogram to form trains of electrical signals. For the purposes of this description, it will be assumed that the seismogram on the drum is one recorded on magnetic tape. It will further be assumed that the seismogram was obtained in a seismic observation wherein a spread of three geophone locations was employed. Thus, the transducers 1, 2 and 3 in the bank 18 are assumed to each reproduce or follow individual geophone traces having the same identifying legends for the sake of convenience. The break point (i.e. the reference time point generally used for seismic observations) is recorded on a separate channel or trace on the tape and is reproduced by means of the transducer B. An unused channel on the magnetic tape is provided to cooperate with transducer I for reasons that will be brought out later hereinafter. It will be noted at this point that this particular channel is employed to record what will be referred to as an index trace.

Insofar as mounting magnetic tape on drum 13 is concerned, it should be noted that any suitable means may be used. It is important, however, that the mounting means be such as to position all tapes on the drum in substantially the same manner in order that the information received from different tapes is consistent and correlatable.

Attached to drum 13 is a cam or equivalent means 19 adapted to close switch 20 once for every revolution of the drum. For reasons that will be apparent later hereinafter, it is preferred that switch 20 be closed by contact with cam or arm 19 substantially at the start or end of each trace.

Monitor drum 12 is adapted to hold a recording medium of a type which is adapted to provide a visual record of the information contained on the magnetic tape of drum 13. More specifically, the recording medium on drum 12 may be paper adapted to receive inked oscillographic traces; or it may be electro sensitive paper of a type adapted to form a visual trace in response to contact with an electro stylus. In any event, it is desirable that the record on drum 12 be composed of visual traces that correspond in juxtaposition and time dimensions with the traces of the record on drum 13. It is further desirable that the recording device 21 automatically position itself on the record of drum 12 at the same point of the same trace as the bank 18 is reproducing on the record of drum 13. Equipment capable of providing these arrangements and functions is well known and well understood by those skilled in the art, and a detailed discussion of such equipment is not considered to be necessary in this description. An example of such apparatus, which is presently commercially available, is the Model FR-1 Field Recorder manufactured by Electro-Technical Labs, Houston, Texas. Briefly, that particular apparatus utilizes an automatic stepping switch which selects consecutive heads on a magnetic tape recording drum and plays back the tape recording one trace at a time. A demodulator and playback amplifier is provided in the playback system; and the output of the amplifier is fed to an electro stylus for display on a drum of electro-sensitive paper turning in unison with the tape drum.

Before proceeding to the remaining components illustrated in FIGURE 1, it will be noted that the seismogram recorded on the paper of drum 12 is assumed to be generally like that illustrated in FIGURE 2. Referring to this figure for the moment, there are illustrated a break point trace identified by the legends 1-3 inclusive. Assuming that the geophones forming traces 1-3 were spaced in that order from the shot point, it will be observed that there exist four reflection crossings indicated by dotted lines in FIGURE 2. These crossings are indicated by the legends 30, 31, 32 and 33. The index channel identified with the legend I in FIGURE 2 contains four index marks 34-37 inclusive. The nature, purpose and origin of these marks will become more apparent later in this description. They are mentioned here for the purpose of simplifying the description that follows.

Referring back to FIGURE 1, converter 11 may be any one of the number of conventional units capable of converting shaft position (analog information) into digital information. Thus, the converter 11 is adapted to convert positions of shaft 9 which are proportional to time on the seismogram into information suitable for recording on punch cards for use in digital computers. It is important and necessary that the converter be capable of providing time readings having an accuracy of about 1 millisecond. Thus, assuming that the seismogram on drum 13 is six seconds in duration, it is necessary that the converter read at least 6000 different shaft positions. A conventional, commercially available converter suitable for performing this type of service is manufactured and sold by the Datex Division of the G. M. Giannini and Company, Inc. under the general designation of C-100 series commutators.

Trace drums 14 and 15 are essentially identical and are provided with a magnetizable material on their outer peripheral surfaces. Gate trace drum 14 is provided with recording head 40, reproducing head 41, erase head 44 and erase generator 45. Transfer trace drum 15 is similarly provided with recording head 43, reproducing head 42, erase head 46 and erase generator 47. Erase generator 47 is further provided with a source of electrical energy 48 which continuously activates the erase generator.

The structural relationship of the various heads on drums 14 and 15 is better understood by briefly considering the reasons for the relationship. Thus, it should be pointed out that it is the purpose of these two drums to record an electrical signal corresponding to a given crossing or event on one event on one trace of a seismogram and to thereafter reproduce that electrical signal at a time corresponding to its occurrence on another trace of the same seismogram. To illustrate this function more clearly, reference is made temporarily to the visual seismogram which is presented in FIGURE 2. There it will be assumed that it is desired to record the reflection event of crossing 30 on trace 1 and to thereafter reproduce this same event for trace 2. It will be recognized immediately, of course, that the crossing on trace 2 is displaced somewhat time-wise relative to the reflection event on trace 1. Accordingly, it is not possible to reproduce simultaneously events on separate traces of a seismogram corresponding to the same reflection crossing in the absence of special provisions. It has been proposed that such simultaneous reproductions be obtained by the use of banks of individually movable transducers. Banks of this type, however, are not particularly suitable, since separate adjustments of the heads are usually required for each reflection crossing.

Still referring to FIGURE 2, it will be apparent that recording and reproduction of the crossing 30 on trace 1 once during every revolution of the drum 15 at point 43 would occur at regular intervals. Since the same reflection crossing on trace 2 of the seismogram occurs at a point later in time than the crossing on trace 1, it will additionally be apparent that reproduction of the crossing on trace 1 in time to concur with the occurrence of the crossing on trace 2 must be delayed slightly. A delay of this type from trace to trace in most seismograms, while measurable and clearly indicated on a seismogram, is nevertheless small enough such that it is physically impossible to place a recording head and a reproducing head side by side in such close relationship on a single trace drum in the absence of special head and trace arrangements. A simple and effective arrangement which disposes of the problem is that indicated in FIGURE 1. Here, heads 41 and 43 are located 360° apart plus or minus whatever time difference is required to bring the same events on adjacent traces into substantial alignment. Heads 40 and 42 are positioned at a convenient point between heads 41 and 43, it being important merely that these two heads be displaced angularly substantially the same distance from head 43. Thus, a signal recorded by head 43 travels upon revolution of drum 15 to head 42 whence it is reproduced to head 40 and recorded on gate drum 14. Upon revolution of this drum, it passes under head 41, where it is again reproduced and transmitted to an electronic gate for a purpose to be explained later in this description.

It will be noted at this point that head 41 is movable along the periphery of drum 14 by virtue of arm 50 and worm gear arrangement 51. The latter arrangement is conveniently pivotally supported on shaft 9 and is adapted to translate linear movements into arcuate movements of head 41. The linear movements and the circular movements are preferably calibrated and indicated in terms of milliseconds in order that desired time delays may be set up directly through this mechanism.

Turning next to trace selector 16, it will be observed that this component of the illustrated apparatus is in essence a double-bank, multi-contact stepping switch having two pivoted contact arms 52 and 53. A solenoid connected through switch 20 to power source 55 is adapted through a suitable mechanical linkage 56 to step arms 52 and 53 progressively through the various contacts of banks 60 and 61, respectively. Mechanical linkage 56 is further adapted to return arms 52 and 53 to their "rest" positions—i.e. the "off" position of bank 60 and the "off" position of bank 61. Such return arrangements are well known in the art, and a detailed description of this particular feature of the trace selector is not included here in the interests of brevity and clarity of presentation.

Conveniently, it will be assumed that bank 60 of the trace selector 16 has an "off" contact position and three trace contact positions identified by the legends 1', 2' and 3'. The latter positions correspond to heads and traces 1-3 respectively on drum 13. It will be recognized at this point that numerous additional trace contacts and traces and heads may be provided and used as desired in this apparatus. The nature and operation of the apparatus, however, is felt to be amply presented by the use of merely three such contacts, traces and heads; and additional information may be handled by a correspondingly increased amount of similar equipment.

Bank 61 of trace selector 16 also contains four contact points, which are conveniently identified by the legends "off" and 1", 2" and 3". The 1" contact in this arrangement is the only contact that actually completes a circuit, the remaining contacts merely being "open" positions on this bank of the switch.

As indicated, the 1" contact is continuously connected to an electrical power source 62. The fixed or pivot end of contact 53 is connected to a relay 63, which is adapted to actuate the double-throw switches 64, 65 and 67. These switches, it will be noted, are interconnected by means of a suitable mechanical linkage 66. When the relay is actuated, the switches 64, 65 and 67 are automatically thrown to the position opposite that shown. Conversely, when the relay is not energized, the switches are returned to the illustrated contact positions by springs or other convenient and conventional means.

Returning for the moment to the index trace head I of the head bank 18, it will be seen that this head is connected to the pivoted end of the contact arm 70 of double throw switch 71. In one position of switch 71, the index head is connected directly to power source 72 which is suitable for registering magnetically recorded index marks on magnetic tape. An example of a satisfactory power source for this use is a conventional multi-vibrator. A push button contact 73 may be provided and is preferred for the purpose of actuating the multi-vibrator.

In the other contact position of switch 71, the index head of the head bank 18 is connected directly to one contact of the switch 64. The other contact point of switch 64 is connected to solenoid 80 as well as the fixed or pivot end of contact arm 81. The solenoid and the contact arm are both integral parts of the crossing selector 17. Other components of the crossing selector include contact bars 34', 35', 36', 37' and 38' as well as solenoid 82, contact arm 83, mechanical linkage 84 and electrical circuit means connecting the pivot or fixed end of arm 83 to one of the contacts of switch 65. Suitable power means such as combinations of relays and the like 85 may be used for actuating the solenoid 82. Similar means may be used where necessary for actuating the other switches and solenoids indicated in the figure. Power means 85, however, should be of the character of a momentary-type relay control, actuating solenoid 82 and stepping arm 83 only upon fresh application of a voltage to the power means. Mechanical linkage 88 connects the contact arm 81 to a second contact arm 86 which moves past a second set of contacts 34″–38″ inclusive. Contact 34″ serves to complete a circuit, the circuit being from power source 87 through power means 85 to solenoid 82. Contacts 35″–37″ inclusive are always open.

The output from the trace selector 16 is fed from contact arm 52 through suitable electrical circuit means 90 and associated equipment to gating means 91 which is normally closed or inoperative. The output from the crossing selector 17 passes from the arm 83 through switch 65 and thence through electrical circuit means 92 to actuate gate 91. Reception of the signals by the gate from the crossing selector actuates the gate and allows signals from electrical circuit means 90 to pass through the gate.

It will be noted at this point that the signals flowing through circuit means 90 to gate 91 are indicated to pass through demodulator 94, filter 95 and event picker 96. It is the function of the event picker to pick or otherwise select a certain fragment or part of the signal which is supplied to it for further transmission to the gate 91. Preferably, the selector 96 is an electronic or electrical circuit adapted to selectively pass the peak (i.e. maximum amplitude) or valley (i.e. minimum amplitude) portions of a generally sinusoidal-type signal. Electronic circuits such as conventional R.C. combinations are particularly suitable for this type of use; and since their nature and functioning are well known to those skilled in the art a further discussion of them is not considered necessary in this presentation. It should be noted, however, that the event picker should be capable of selectively passing either the "peak" or "valley" portion of signals in the seismic frequency range; and it is generally preferred that only the "valley" portions be passed.

The demodulator 94 and the filter 95, while preferred for use in conjunction with this invention are not vital always to the invention, since it is theoretically possible to record and reproduce "pure" seismic signals without modulation or filtering. However, most modern seismic recording apparatus and methods use one of several types of modulation and filtering; and a demodulator and a filter are therefore desirable in order to render the present apparatus and method consistent and compatible with existing seismic systems.

The gate 91 may be a conventional triode-type electronic device biased such that signals received from crossing selector 17 change the bias on the triode an amount sufficient to render it conductive. The bias, of course, may be adjusted to require signals of a predetermined magnitude to activate the gate. During conductive periods, signals from the trace selector 16 may flow through event picker 96 and thence through double throw switch 97. In one contact position switch 97 is able to pass signals from gate 91 to a digital storage translator 98 or other suitable signal receiving means. In a second position, switch 97 passes signals from the break point head in head bank 18 to the digital storage translator 98.

At this point it is well to note that digital storage translators of the type referred to above are well known and widely used in the art. Briefly, it may be stated that the translator 98 is a device capable of storing the output from the shaft position-to-digital converter 11 and for translating the information thus received into contact closures having a digital representation. With suitable cabling, the output of a translator may be used to directly operate a numeric printer or a card punch suitable for use in conjunction with a high speed digital computer. A typical storage translator of a type which is suitable in the practice of this invention is manufactured by the Datex Division of G. M. Giannini and Company, Inc. under model number K–106. This particular translator employs a plurality of thyratrons, combinations of which are rendered conductive by signal combinations from the converter. The thyratrons in turn actuate relays to supply signals of suitable magnitude to a printer, card punch or the like. Other series of signals may also be supplied to the card punch for use in systematically storing and using the information in a computer. To recapitulate briefly, the translator 98 receives encoded shaft positions from converter 11 and translates the information thus received into a digital representation on a printer or a card punch—the "read out" of the latter information being controlled by the event picker and being further rendered suitable for introduction to a digital computer.

Referring back to switch 20, it will be observed that the pivot end of this switch is connected to a relay 100 through electrical circuit means 99. The relay 100, when energized, causes double throw switch 101 to connect power source 102 to an open contact. Expressed otherwise, energization of relay 100 opens the contact which switch 101 has in its other position. In its latter position switch 101 connects power source 102 to an erase oscillator 45 and thereby energizes the oscillator.

Switch 101 is thrown to its other position by energization of latch relay 103 by signals received from gate 91. Thus, all pulses of energy which pass through gate 91 cause relay 103 to in turn cause oscillator 45 to become activated.

The signals that energize relay 103 are also conveyed by means of electrical circuitry 104 to recording device 21 on drum 12. In this manner, visual recording of pulses transmitted to digital storage translator 98 are recorded on drum 12 at the same positions along the traces on this drum as exist on the corresponding traces recorded on drum 13.

Having thus briefly considered and described the structural components of the apparatus in FIGURE 1, attention is now directed toward a consideration of the manner in which this apparatus may be operated. In connection with such a discussion, it will be assumed, as indicated earlier, that the seismogram mounted on drum 13 is a multi-trace magnetic tape having three geophone traces, a break point trace and an unused channel for indexing purposes.

It will further be assumed that the monitor record on drum 12 is a visual type record formed by contacting an electro-sensitive paper with an electro stylus. It will also be assumed that the visual seismogram is similar to that illustrated in FIGURE 2 and that it is a consistent reproduction of the seismogram on drum 13 such as may be obtained directly in the field using field recording apparatus of the type described hereinbefore. Thus, the visual record has a break point trace, three geophone traces and an unused channel—the last channel being identified in FIGURE 2 by the capital letter I. With the visual seismogram on drum 12 and the reproducible seismogram on drum 13, examination of the visual seismogram is made by the operator or interpreter using the apparatus. As is apparent in FIGURE 2, there are four apparent reflection crossings; and it will be assumed that the operator of the equipment desires to reproduce these four crossings to the substantial exclusion of other information on the geophone traces. It will further be assumed that it is desired to translate this information into digital information suitable for introduction to a digital computer.

Having selected reflection crossings 30–33 inclusive, the operator places index marks at points 34–37 in the index channel I in the following manner. First, shaft 9 is rotated until the stylus portion of recording device 21 is positioned substantially directly opposite the crossing on trace 1. Then switch 70 is moved to the contact point which causes multi-vibrator 72 to be connected directly to head I in the head bank 18. Switch 73 is then momentarily closed and energy supplied from multi-vibrator 72 directly to head I with the result that an index mark (of magnetic intensity) is recorded on channel I of the magnetic tape at a point directly corresponding to index mark 34 on channel I of the visual seismogram. This procedure is repeated by hand for each one of the reflection crossings.

The break point on the trace B of the magnetic tape may be reproduced and the break point translated into digital information at any convenient time. In most instances, it will be generally preferred to record this information at this point in the operation of this invention. To record the break point, switch 20 is maintained in an open position; switches 52 and 53 are placed in the positions illustrated; and switch 97 is put in a position to connect the output of the break trace head of bank 18 to translator 98. The recording device 21 is positioned—either automatically or manually—over the break point channel of the visual seismogram. Shaft 9 is then rotated—e.g. by actuating motor 10—until the break point on the break point trace comes under head B of bank 18. Travel of the break point on the trace past the head causes a signal to be transmitted to switch 97 and thence to digital storage translator 98. Converter 11 transmits a signal indicating the shaft angle of shaft 9 to digital storage translator 98; and this information is converted by the translator into digitized information in response to the pulse of energy received through switch 97. In short, the angular position of the break point on drum 13 (or shaft 9) is fed and translated into digitized information to translator 98. Since the angular position of the break point on the drum is directly related to its time on the seismogram, this information is likewise converted into digitized information. In receiving the information from the converter 11, translator 98 further transmits this information as desired to a printer (e.g. a Clary Printer), a punch card digitizer or the like.

Having digitized the break point information, the reflection crossings on the geophone signal traces may now be digitized in the following manner. First, switch 70 is thrown to the contact which connects the index head I on bank 18 directly to one contact of switch 64. Switch 20 is rendered operative so that revolution of drum 13 now causes arm 19 to engage and close the switch once during every revolution of the drum. Arm 19, of course, is positioned on the drum relative to the magnetic tape so that closure of switch 20 occurs whenever any given trace on the tape has been completely scanned. Switch 97 is thrown so that the output of gate 91 is connected directly to translator 98 as well as amplifier 99.

As explained earlier in this presentation, the crossing of any given reflection will not generally occur at the same point in time along each trace of a sesismogram. Accordingly, in order that all of the reflections corresponding to a given crossing in a seismogram may be selectively reproduced and transmitted to translator 98, it is necessary (as explained earlier) to have some means for compensating for the time differentials that exist in the trace-to-trace recordings. This is accomplished in the following manner.

First, visual examination of the seismogram on drum 12 may be employed to ascertain the time intervals that exist from trace to trace along a given crossing. For example, referring to FIGURE 2, the time intervals between the reflections of crossing 30 for traces 1 and 2 and for traces 2 and 3 are determined. Knowledge of the magnitude of these intervals enables the operator of the apparatus to adjust the point in time at which gate 91 must open and the period of time that the gate 91 must remain open while recording adjacent traces to selectively reproduce information from the traces. Expressed otherwise, if the angular position of drum 13 and shaft 9 is known for the point in time at which the reflection crossing 30 on trace 1 is reproduced, it becomes possible to selectively reproduce the corresponding crossing on trace 2 as follows. First, the angular position between crossing 30 on trace 1 and trace 2 is determined and gear 51 turned until arm 50 moves reproducing head 41 at least a corresponding distance along the outer periphery of drum 14. Since the occurrence of crossing 30 on trace 2 is at a later point in time than on trace 1, it follows that the distance between head 43 and head 41 must be something in excess of 360° in order that the crossing on trace 1 may be reproduced from drum 14 at a time coincident with the reproduction of the crossing on trace 2 from drum 13.

It will be recognized that the movement or adjustment of head 41 could conceivably vary substantially throughout the traces on a seismogram provided the intervals between corresponding events on the same or different crossings should happen to vary materially. In actual practice, however, it has been found that one setting of the head 41 is almost unanimously suitable for an entire seismogram. Furthermore slight discrepancies or differences in the intervals are readily compensated for by the length of time that the gate 91 is open in response to signals from the crossing selector. Thus, substantially complete automatic and faithful operation of this equipment and procedure is realized.

Having adjusted head 41 for the time intervals between events on adjacent crossings and traces, reproduction of the magnetic tape seismogram and digitization of crossings 30–33 are realized in the following manner.

To reproduce and digitize the reflections on the magnetic tape record, the following procedure is observed. First, the following arrangement of switches and the like is employed. Switch 71 is arranged to connect index head I with switch 64; contact arms 53 and 52 are placed on their "off" positions; switches 64, 65 and 67 are stationed as indicated; contact arms 81 and 83 are both connected to contact bar 34'; arm 86 is connected to contact 34''; switch 97 is arranged to connect gate 91 with translator 98; and switch 101 may be placed in a neutral position. Motor 10 is brought up to speed, and during its acceleration, the relays (not illustrated) energizing the relay power sources are not turned on. However, once motor 10 and shaft 9 are operating at the desired constant speed, the energizing relays may be turned on. It will be recognized, of course, that head 41 has been adjusted a suitable distance along drum 14 to provide for the time intervals that are necessary to reproduce sequentially the reflection crossings on the magnetic tape.

Once the energizing relays have been turned on, the following sequence of signals and operations is experienced. First, a signal is transmitted from source 55 through switch 20 (upon contact of arm 19) to solenoid 54. This signal causes the solenoid to step contact arms 52 and 53 to contacts 1' and 1'' respectively. When contact arm 53 reaches contact 1'', an electrical circuit is completed from source 62 to relay 63. Energization of the relay causes switches 64, 65 and 67 to move to their opposite contacts. Power source 68 is thereby connected to erase oscillator 45, and any stray signals on drum 14 are erased by energization of head 44.

Shortly after switch 20 has been operated in the manner just described, the first index mark on the index channel of the magnetic tape (corresponding to mark 34 in FIGURE 2) passes under the index head I and is transmitted via switches 71 and 64 to crossing selector 17. Reception of the signal by the crossing selector causes solenoid 80 to step switch 81 from contact bar 34' to bar 35'. Since, as explained earlier, relay control 85 is of a character not to actuate solenoid 82 except upon a fresh contact of contact arm 86 with contact 34'', arm 83 is not stepped to contact bar 35' at this time.

It will be noted at this point that the stepping switches of the crossing selector 17 are provided with at least one more contact position for the contact arms 86 and 81 than there are crossings on the seismogram in FIGURE 2. The extra contact positions—in this instance 38' and 38"—are employed to actuate conventional circuit means for returning the contact arms to contact positions 34' and 34" automatically. Upon return of the contact arm 86 to position 34", energy is supplied from source 87 through this contact to momentary relay control 85 which energizes solenoid 82 and instantaneously steps contact 83 to contact bar 35'. Subsequent index marks on the index trace, it will be noted are not transmitted through the crossing selector, since the contact arms 83 and 81 are now no longer positioned on the same contact bar.

As stated above, conventional circuit means may be connected between contact position 38" and solenoid 80 for moving arm 81 to contact bar 34' when contact arm 86 reaches contact position 38". In the interest of brevity, suitable circuit means for performing this function have not been included in FIGURE 1. It will be recognized, however, that a simple relay device actuated by power source 87 may be used to provide an input to solenoid 80 which is substantially identical to the signals received from index trace I. Such a device, for example, is already included in a Model MT–4 office playback unit manufactured by Electro-Technical Labs of Houston, Texas.

In addition to stepping contact arm 81, it will be apparent that signals from the index trace are transmitted from the crossing selector 17 through switch 65 to gate 91.

Substantially simultaneously with the reproduction of the first index mark of the index trace, the crossing or reflection on channel 1 of the magnetic tape (corresponding to crossing 30 on channel 1 in FIGURE 2) is reproduced by head 1 and transmitted through contact 1' and contact arm 52 to the demodulator 94. Here it is further transmitted through filter 95 and event picker 96 to gate 91.

Since gate 91 has been opened by reception of the index mark signal from circuit means 92, the reflection crossing signal passing through picker 96 also passes gate 91 and then travels to translator 98 and amplifier 99.

Reception of the pulse by translator 98 causes information to be received from converter 11; and the information from the converter is translated into digitized information. The digitized information may be further transmitted to a card punch or printer as the case may be.

Upon passing amplifier 99, the signal passed through gate 91 from the first crossing on the first channel of the magnetic tape reaches head 43 where it is recorded on drum 15. The recorded signal moves with the drum to head 42 where it is transferred to head 40 and drum 14. Here the signal further moves until it comes under head 41. While this process is going on, the signal to head 43 simultaneously energizes relay 103 thereby switching contact arm 101 and energizing oscillator 45 by connecting it to energy source 102. It may be noted that although during this revolution, activation of relay 103 is paralleled by closure of switch 67, subsequent revolutions require activation of the relay since switch 67 is open. The signal also flows through circuit means 104 to recording device 21. The stylus of the recording device, in turn, makes a mark on the seismogram on drum 12, thereby indicating specifically where the "pick" on trace 1 has been made.

Meanwhile, continued revolution of drum 13 causes switch 20 to again be energized by contact with arm 19. It will be noted that one result of this closure is to energize solenoid 100, thereby deactivating oscillator 45. A signal from source 55 therefore re-energizes solenoid 54 and causes contact arms 52 and 53 to step from 1' and 1" to 2' and 2". The circuit between source 62 and relay 63 is thereby broken, and switches 64, 65 and 67 swing back to their other contacts. It will be apparent then that the head bank 18 is now connected to reproduce trace 2 of the magnetic tape on drum 13. Accordingly, the first reflection signal produced by head 2 from channel 2 of the tape (corresponding to crossing 30 on channel 2 in FIGURE 2) flows from head 2 through contact 2' and contact arm 52 to electrical circuit means 90. Here it passes through demodulator 94 and filter 95 and picker 96 to gate 91. In view of the fact that reproduction of the first signal on channel 2 of the tape hits gate 91 substantially at the same time as the signal picked up by head 41 from drum 14, gate 91 is open to the former signal; and the signal is passed through switch 97 to translator 98. It also passes through amplifier 99 to head 43. In other words, the reflection crossing signal on channel 2 of the tape is registered on drum 15 at substantially the same instant as the corresponding signal from the preceding channel is reproduced by head 41.

As drum 14 continues to revolve around shaft 9, the signal on this drum corresponding to the first crossing of channel 1 of the tape is erased by the erase oscillator and erase head 44. Thus, the exterior surface of drum 14 is once more ready to receive a signal from drum 15 through heads 42 and 40. It will be recalled at this point that oscillator 45 is continuously energized through switch 101, until such time as relay 100 is energized by reception of a signal from source 55 through switch 20. In other words, the contact arm of switch 101 tends to remain in one contact position or the other until it is positively moved to the other contact by reception of a fresh electrical signal.

Substantially the same sequence of events occurs in reproducing the first crossing on channel 3 of the magnetic tape as has just been described for the first crossings of channels 1 and 2 on the tape.

The following changes in the sequence of events, however, occur when the contact 20 is closed by arm 19 at the point when trace 3 on the magnetic tape has been reproduced. First, closure of the contact 20 energizes solenoid 54, and contact arms 52 and 53 are automatically returned to their "off" positions. Nothing additional takes place during the ensuing revolution of shaft 9 and drum 13. Upon the next closure occurrence for switch 20, however, contact arms 52 and 53 are stepped to contacts 1' and 1". Closure of the latter contact once more energizes relay 33 and causes switches 64, 65 and 67 to switch their contact positions. Closure of switch 67, it will be recalled, causes erase head 44 to be energized so that any remaining signal on drum 14 is removed. The crossing selector 17 is now in a condition to receive impulses from the index trace on the magnetic tape and the index head I of bank 18. The first impulse (corresponding to index mark 34 in FIGURE 2) energizes solenoid 80 and thereby moves contact arms 81 and 86 to contact bars 35' and 35" respectively.

The next index mark on the index trace (corresponding to index mark 35 in FIGURE 2) completes a circuit through switch 65 to gate 91. Gate 91 is thereby opened at this point to pass whatever signal is at that instant being reproduced on trace 1 of the magnetic tape by head 1 of bank 18. Substantially at the same time, index pulse 35 energizes solenoid 80 which in turn moves contact arms 81 and 86 to contact positions 36' and 36", respectively. A brief examination of the status of trace 1 on the magnetic tape when index pulse 35 arrives at gate 91 reveals that the reflection or point of the tape passing under the head 1 at this instant corresponds to the crossing 31 in FIGURE 2. Thus, during this phase of the overall operational sequence of the illustrated apparatus, the reflections on the traces 1–3 corresponding to crossing 31 in FIGURE 2 are reproduced, and their times of occurrence converted into digitized information.

After the reflections on traces 1–3 corresponding to crossing 31 in FIGURE 2 have been processed by the illustrated equipment, trace selector 16 and crossing selector 17 again function—this time to reproduce the crossings corresponding to crossing 32 in FIGURE 2 and thereafter crossing 33 in the same figure. The operational sequences involved are substantially similar to the sequences just described; and it is therefore not considered necessary to repeat the description ad infinitum for each particular crossing and the like. It is believed to be readily apparent at this point that the equipment illustrated in FIGURE 1 has been demonstrated to be satisfactory and suitable for the objects of this invention.

While the system illustrated in FIGURE 1 represents the preferred embodiment of this invention, and while this embodiment is considered to be the best mode of carrying out this invention, it will be recognized that numerous variations and modifications may be employed in the system without departing from the spirit or scope of the invention. Furthermore, it will also be recognized that certain obvious structural features have not been included in FIGURE 1 in order to render this figure as simple and readily comprehensible as possible. In connection with the latter point, for example, it will be apparent that suitable bearing means and base or supporting means have not been illustrated for supporting shaft 9 and its various drums. Again, certain electrical or electronic circuitry suitable for energizing various components of the illustrated electrical system have not been included, since such items are well known and well understood by persons skilled in the art.

With respect to possible variations and modifications of the apparatus in FIGURE 1, it will be observed that reproducible seismograms other than magnetic tapes may be readily adapted for the purposes of this invention. For example, reproducible seismograms in the form of variable density or variable area seismograms may be easily and readily utilized. In these instances it will be generally desirable to use photoelectric cells or equivalent phototransducers as scanning devices in place of the magnetic heads that constitute the head bank in the figure.

It is also possible to have the event picker 96 be selectively adjusted to pass portions of a seismic signal other than a peak or valley. For example, it is possible to have this portion of the equipment pass portions of a signal where the rate of increase of the magnitude of the signal is of a certain predetermined value. It is also possible to dispense with the visual drum 12 and the visual seismogram mounted thereon and to detect the occurrence of crossings on the reproducible traces by other means. The use of the visual seismogram, however, affords the operator of the equipment distinct operational advantages in that the operator may not only make his selections of crossings with ease; but he may also observe directly on this seismogram the points at which the event picker 96 has selected information to be digitized.

It will be noted in FIGURE 2 of this description that the reflections corresponding to the same crossing on channels or traces 1–3 are such that the reflections on subsequent traces follow one another systematically in their time of occurrence. It will be recognized that the reflections need not occur in this particular order; and progressively later or staggered earlier events as well as later events may be readily selected and digitized by merely shifting head 41 and/or adjusting the "open" period of the gate 91.

The apparatus in FIGURE 1 was described in connection with processing an entirely uncorrected field seismogram. It should be noted at this point that partially or completely corrected seismograms may also be processed in accordance with this invention. Where the invention is to be used in conjunction with velocity profiling procedures, however, it will be generally desirable to use entirely uncorrected records.

Further relative to the apparatus of FIGURE 1, it will be noted that the apparatus in this figure—upon each revolution of the shaft 9 and drum 13—reproduces one crossing per trace. It therefore requires as many revolutions of the drum to reproduce each complete crossing as there are traces on the tape. This number of revolutions is further multiplied by the total number of crossings. It will be apparent, however, that certain other apparatus arrangements may be employed such that the total number of drum revolutions required to reproduce all of the reflections on a seismogram may be substantially reduced. For example, it is possible— by expanding the capacity of the digital storage translator 98—to eliminate the crossing selector 17 and to reproduce and transmit to the translator during a single revolution of the drum 13 all of the reflections or crossings that exist on each single trace. Since the information capacity of conventional punch cards and the associated card punch machines is relatively large, compared to the amount of information being recorded for a single reflection on one trace, all of the information stored in the translator by an operation of the type just described can be handled and processed by a card punch in one operation on a single card. Furthermore, it will be apparent that a system of assigning an identifying code to the digitized information may well vary from the system utilized in conjunction with the apparatus of FIGURE 1. These and other modifications are considered to be well within the knowledge and skill of persons versed in the art of high speed computing machines.

Figure 3:
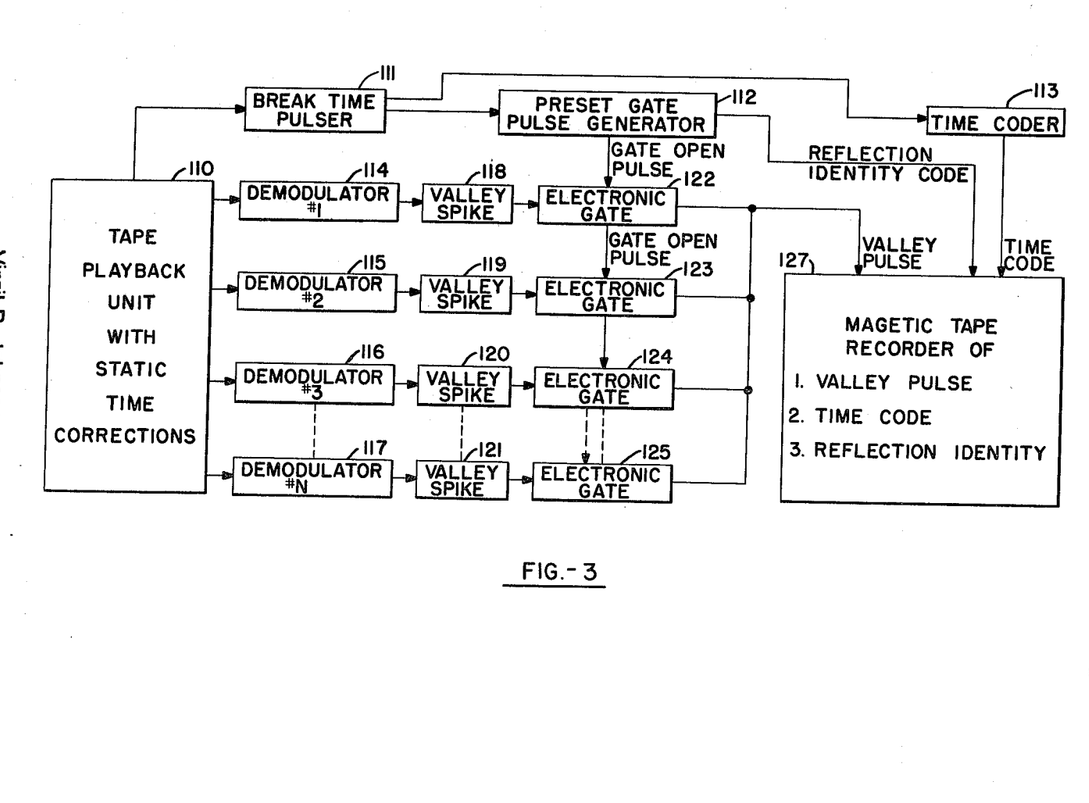
FIGURE 3 is a schematic illustration of another embodiment of the invention.

FIGURE 3 shows in a schematic block presentation another type of system utilizing the principles of this invention wherein all of the reflections of interest in a reproducible seismogram may be reproduced and assembled in a form for introduction to a computing machine. In this system all of the reflections on the seismogram are processed during one scanning operation. In other words, all of the reflections in the seismogram may be processed during a single revolution of a drum upon which the seismogram is mounted.

In studying FIGURE 3, it will be noted that simple blocks have been used to illustrate what may in some instances comprise rather complicated electronic, mechanical or electrical equipment. However, in each instance these blocks represent items which are well known to persons skilled in the art; and it is considered that sufficient detail is presented in the figure to enable those skilled in the art to readily comprehend and employ the same—especially in view of the material disclosed earlier in this description and in FIGURE 1.

Briefly, the system illustrated in FIGURE 3 includes tape playback unit 110, break time pulser 111, a preset gate pulse generator 112, a time coder 113, demodulators 114–117 inclusive, valley spike generators 118–121 inclusive, electronic gates 122–125 inclusive, and a magnetic tape recorder 127.

Conveniently, tape playback unit 110 and magnetic tape recorder 127 may comprise two drums mounted on a common shaft and rotated in unison in much the same manner as drums 12 and 13 of FIGURE 1. It is preferred, however, that the recorder employ a reel-type magnetic tape which operates at a tape speed greater than the playback unit. Also as in FIGURE 1, tape playback unit 110 is adapted to receive and reproduce a multitrace reproducible seismogram having a break time trace and a plurality of geophone traces. Since most present day seismic recorders record seismic information in modulated form, it will be assumed that the information on the seismogram in this instance is modulated.

Before proceeding with the description of the remaining components of the system illustrated in FIGURE 3, it is well to note at this point that this system is limited substantially in its application to seismograms in which the events on the traces in the seismogram corresponding to the same reflection crossing occur at progressively later times. For example, the system is particularly suitable for handling seismograms obtained by using geophone spreads wherein the geophones are arranged in linear arrays in a direction away from a shot point and wherein all of the geophones are at substantially the same elevation. In those instances where the events do not occur progressively later on adjacent traces (e.g. in instances where static errors of considerable magnitude are present because of LVL variations or large differences in elevation of the geophones) it is preferred to supply the tape playback unit with a magnetic tape seismogram in which the static errors have been corrected. Equipment suitable for preparing such a seismogram is already commercially available and well known in the art. For example, Electro-Technical Labs of Houston, Texas, already has on the market a model MT-4 office playback system (mentioned hereinbefore) which is especially characterized by its ability to enter static time corrections on a seismogram and to reproduce the seismogram with the corrections entered.

Break time pulser 111 may be essentially a transducer which is adapted to scan the break time trace on the seismogram on the tape playback unit and to transmit the break time signal to the gate pulse generator and also to the time coder 113. It will be recalled, as pointed out earlier in this description, that the break time of a seismic observation is generally used as reference time for all information on the seismogram.

The preset gate pulse generator 112 may be considered to comprise a plurality of electronic or electrical circuits, each of which is adapted to perform as an adjustable time delay circuit. There should be at least one such time delay circuit for each reflection or crossing of interest on the seismogram. In conjunction with the system illustrated in FIGURE 3, the break time pulser feeds the break time pulse to the gate pulse generator 112 and serves as reference time for each one of the delay circuits.

Each time delay circuit in the gate pulse generator is then adjusted and preset to transmit a pulse to the electronic gate 122 at a time corresponding to the reproduction of the first reflection of each crossing on one trace of the seismogram. The trace whose reflections are triggered in this manner should be the trace upon which all of the crossings in the seismogram are displayed at the earliest points in time relative to the break time. In other words, referring back to the seismogram in FIGURE 2, the time delay circuits in that instance would be set to generate signals corresponding in time to the occurrence of the crossings on trace 1 of that particular seismogram. Thus, electronic gate 122 in FIGURE 3 would be set to be opened by its particular time delay circuit at a time corresponding to or slightly before the occurrence of the crossing 30 on trace 1 in the seismogram of FIGURE 2. The electronic gate 122 would also be set to be again opened at a time corresponding to or slightly before the crossing 31 on trace 1 of the seismogram in FIGURE 2. This procedure would be repeated for each one of the crossings on trace 1—a separate time delay circuit being preset to open at the proper time for each crossing.

Referring back now to FIGURE 3, it will be seen that a separate playback head is employed to reproduce each trace of the seismogram on the tape playback unit 110. Each reproduced trace is transmitted to a separate demodulator (114–117 inclusive), and demodulated signals are then transmitted to the valley spike generators 118–121 inclusive. The valley spike generators may be in effect essentially the equivalent of the event picker 96 in FIGURE 1 of this description. Briefly, each one of the spike generators acts to generate a narrow pulse or spike for each valley in the seismic signals which are received by these generators.

Normally, the outputs of the valley spike generators are blocked by the electronic gates which are normally inoperative or closed. Opening of the gates, however, permits one of the spikes generated by the spike generators to pass through the gates and to be transmitted to the pulse recorder 127. For example, when electronic gate 122 is opened in response to a pulse received from the gate pulse generator 112, this gate is opened and permits a spike from unit 118 to pass to pulse recorder 127. Upon passage of the spike, the electronic gate 122 automatically closes. However, the closing of the electronic gate 122 is further adapted to transmit a pulse to the electronic gate 123 associated with the second channel or trace of information on the tape playback unit 110. This transmitted pulse opens gate 123 so as to transmit a spike from unit 119 which is slightly behind valley spike 118 in terms of time. Indeed, it is this principle which is used to sequentially reproduce the indications of the same seismic crossing that exist on adjacent traces in a seimogram. This same sequential opening of electronic gates for adjacent traces on a seismogram is repeated until (1) each crossing corresponding to a single event is reproduced and (2) until all of the crossings in the seismogram have been reproduced.

As noted above, each pulse transmitted by the electronic gates in FIGURE 3 is transmitted to the pulse recorder 127. This component may be considered to include whatever electronic circuitry, amplifiers and the like may be necessary to transmit and record a signal on a magnetic tape. It should be noted, however, that all pulses received from the electronic gates by the pulse recorder may be recorded on a single channel.

Since there must be some means for identifying the pulses that are associated with particular traces and with particular reflections, two other trains of signals should also be transmitted to the recorder 127 along with the pulses from the electronic gates. A first of these trains of pulses is identified in FIGURE 3 by the legend "reflection identity code." This identity code emanates from the preset gate pulse generator and may consist conveniently of combinations of short pulses, a different combination being employed in conjunction with each time delay circuit in the gate pulse generator. Thus, a single short pulse may be used to identify each reflection on the different traces of the seismogram that make up the first crossing on the seismogram. Similarly, two pulses may be used to identify the reflections that are associated with the second crossing on the seismogram, etc.

To keep or maintain a continuous time record of the occurrence of the signals recorded on the magnetic tape of recorder 127, signals from the time coder 113 are continuously recorded in a separate channel on the magnetic tape. The coder may be any convenient type of signal generating means which is capable of generating a series of equally spaced pulses or equivalent timing means in response to an initiation pulse from the break time pulser 111. For example, the coder 113 may be of a character to generate a pulse for every millisecond that elapses following reception of a break time pulse from the break time pulser 111.

The record thus produced on the magnetic tape on the drum 127 may consist in its simplest elements of three channels of information. A first channel contains all of the pulses that are placed on the tape by the electronic gates; a second channel contains pulses or other signals suitable for identifying which pulses of the first channel are associated with different reflections; and a third channel provides a continuous time measurement enabling the operator or a subsequent machine to determine the interval of time between the break time and the occurrence of each pulse in the preceding two channels.

Magnetic tapes of the type just described and formed on recorder 127 are useful in many ways. They are outstandingly useful in connection with digital computers of a character adapted to receive information recorded in magnetic tape form. The information on the magnetic tape may be programmed and introduced into such a computer, and numerous seismic calculations may be performed using the data thus introduced. For example, calculations may be made to correct the data for seismic errors occasioned by geophone spreads. Again, the information may be employed in connection with velocity profiling techniques to provide very accurate information concerning the position of substrata in the vicinity of a seismic observation.

To recapitulate briefly, then, this invention relates to an apparatus and method for extracting or otherwise "highgrading" information from a multi-trace reproducible seismogram by reproducing portions of the traces in response to signals obtained by prior reproduction of portions of other traces. More specifically, the reflection event on a given trace corresponding to a given crossing is reproduced; and the resulting signal is employed to selectively isolate or pass the signal generated by reproducing a corresponding portion of another trace. The reproduced portions (i.e. the resulting signals) are recorded systematically—preferably correlating the signals according to their times of occurrence and their traces and crossings. The signals are preferably recorded in a form suitable for presentation to a digital computer (i.e. as punched cards, magnetic tape, etc.); although they may also be recorded in the form of a seismic section.

It should be pointed out at this point that most high speed computing equipment is readily adapted to organize information such as the record times digitized by this invention in accordance with reflection crossing information and trace information. Where necessary or desirable, however, such organization may also be achieved independently by the invention itself as indicated in the embodiment shown in FIGURE 3.

It will be recognized that an occasional seismogram may not have adequate signals on all traces of the seismogram to enable the apparatus and process of this invention to project a reflection crossing entirely across the seismogram. In actual practice, such occurrences are quite rare and are usually limited to one or two traces out of an entire seismogram. The occurrences are usually due to faulty geophones or other instrumental failures which are to be expected in field practice.

While the present apparatus through the functioning of erase oscillator 45 is capable of carrying a gate location across one or more "dead" traces, it may be desirable in some cases to extrapolate a time "pick" in these dead traces from the location of "picks" in adjacent traces. This operation must obviously be done by a human interpreter and subsequently recorder or reproduced by the apparatus with the aid of additional minor features.

As an example of a way in which this may be done, an additional magnetic tape drum may be included in shaft 9 containing a number of channels corresponding to the number existing on drum 13. These channels may be adapted to record the manually inserted time "picks" in substantially the same manner as the index signals are recorded on drum 13 in channel I. The reading head arrangement on this auxiliary drum can conveniently be of a dual character for each channel such that one reading head anticipates by a short interval of time a second head corresponding in position to the reading head on the main drum 13. When the first reading receives a correction pulse from the auxiliary drum, it causes the gate 91 to receive its next signal input from the second head on the auxiliary drum instead of from the picker 96 in the usual manner. The second head then feeds the correction pulse into gate 91 at the appropriate time for subsequent reproduction. Expressed otherwise, the dual head arrangement on the auxiliary drum scans the same trace position at any given instant as that being scanned and reproduced on the drum 13. The anticipating head is advanced ahead of both the second head of the auxiliary drum as well as the corresponding head on drum 13. The latter two heads are in substantially identical time positions along their respective records. Thus, the second head on the auxiliary drum reproduces a signal at the time designated by the interpreter which corresponds to the time position of the missing "pick" on the original record.

What is claimed is:

1. An apparatus for reproducing a reflection crossing from a multi-trace reproducible seismogram which comprises, supporting means adapted to receive said seismogram, transducing means adapted to scan along the length of each trace of the seismogram to form a separate train of electrical signals for each trace, signal gating means, event selection means adapted to pass portions of each train of signals having a predetermined characteristic, electrical circuit means adapted to conduct each train of said electrical signals to said event selection means to conduct the portions passed thereby to said gating means, means responsive to a preselected event on a first of said traces corresponding to said crossing to actuate said gating means for a period sufficient to pass one of said portions received from said event selection means, and time delay means adapted to receive a signal transmitted through said gating means and to open said gating means after a predetermined period of time on the seismogram.

2. An apparatus as defined in claim 1 including means to identify the time positions of the events along each trace corresponding to said portions passed through said gating means.

3. An apparatus as defined in claim 2 including recording means cooperative with the identification means to record the time positions of events along each trace of the seismogram in response to corresponding signal train portions passed by said gating means.

4. An apparatus for reproducing a reflection crossing from a multi-trace reproducible seismogram which comprises, a separate transducer adapted to scan along the length of each trace of the seismogram and to reproduce the seismic signals recorded thereon, event selector means of a character to pass portions of said reproduced signals having a predetermined characteristic, trace selector means adapted to sequentially connect each transducer to said event selector means, gating means connected to said event selector means, means to open said gating means substantially instantaneously with the reproduction of the event along a first trace of the seismogram corresponding to the reflection crossing, time delay means responsive to the opening of said gating means to reopen said gating means at a time along another trace on the seismogram predetermined to coincide with the reproduction of the corresponding crossing event by the transducer scanning the latter trace.

5. An apparatus as defined in claim 4 including means to generate a signal indicating the time position along any given trace of the event on that trace corresponding to the signal passed by the gating means when the event on the trace is reproduced by the transducer scanning the trace.

6. An apparatus as defined in claim 5 including recording means actuated by a signal passed by the gating means to record the time position signal indicated for the event on the seismogram corresponding to the signal passed by the gating means.

7. An apparatus for selecting information from a multi-trace reproducible seismogram which comprises transducer means adapted to scan each trace and to reproduce the seismic signals recorded thereon as a sinusoidal-type train of electrical signals, event selection means adapted to receive and pass signal portions of each train having a predetermined characteristic, normally closed gating means adapted to receive said signal portions from said event selection means, position indicating means adapted to generate coded electrical signals identifying the time positions of said transducer means along the seismogram during the scan of each said trace, recording means adapted to receive the electrical signals from said position indicating means, crossing selection means adapted to open said gating means at preselected points during the scan of a first trace, said recording means being further adapted to record the electrical signals from said position indicating means in response to signal portions received from said gating means, delay means responsive to each signal portion passed by said gating means to open said gating means for a predetermined period and at a predetermined position along the next trace scanned by said transducer means.

8. An apparatus as defined in claim 7 in which said event selection means is a resistance-capacitance combination.

9. An apparatus as defined in claim 7 in which the recording means constitutes means for translating the coded electrical signals from the position indicating means into digitized representation.

10. An apparatus as defined in claim 7 in which the transducer means is adapted to scan the traces on the seismogram sequentially.

11. An apparatus as defined in claim 7 in which the event selection means is of a character to pass the peaks of the signal trains.

12. In an apparatus for reproducing a reproducible seismogram having at least two reproducible geophone traces and including means to scan along and reproduce the traces to form electrical signals, the improvement which comprises gating means operative during the scan of a first of said traces to gate a preselected interval of the signal reproduced therefrom, means responsive to the gated signal to operate said gating means when scanning a second of said traces, and delay means to vary the point during the scan of said second trace when said gating means is operated in response to said gated signal.

13. An apparatus as defined in claim 12 including event-selection means cooperative with said gating means to gate portions of said signal intervals which have a predetermined characteristic.

14. An apparatus as defined in claim 13 including means responsive to scanning movements along said traces to indicate the times of said gated signal portions along said traces.

References Cited in the file of this patent

UNITED STATES PATENTS

| | | |
|---|---|---|
| 2,617,704 | Mallina | Nov. 11, 1952 |
| 2,620,890 | Lee et al. | Dec. 9, 1952 |
| 2,683,254 | Anderson | July 6, 1954 |
| 2,721,990 | McNaney | Oct. 25, 1955 |
| 2,732,025 | Lee | Jan. 24, 1956 |
| 2,803,515 | Begun | Aug. 20, 1957 |
| 2,912,673 | Groenendyke | Nov. 10, 1959 |

FOREIGN PATENTS

| | | |
|---|---|---|
| 167,102 | Australia | Feb. 27, 1956 |
| 748,782 | Great Britain | May 9, 1956 |